(12) United States Patent
Lin (10) Patent No.: US 8,441,414 B2
(45) Date of Patent: May 14, 2013

(54) LUMINANCE ENHANCEMENT STRUCTURE WITH MOIRÉ REDUCING DESIGN

(75) Inventor: Craig Lin, San Jose, CA (US)

(73) Assignee: SiPix Imaging, Inc., Fremont, CA (US)

( * ) Notice: Subject to any disclaimer, the term of this patent is extended or adjusted under 35 U.S.C. 154(b) by 771 days.

(21) Appl. No.: 12/628,014

(22) Filed: Nov. 30, 2009

(65) Prior Publication Data

US 2010/0141573 A1 Jun. 10, 2010

Related U.S. Application Data

(60) Provisional application No. 61/120,243, filed on Dec. 5, 2008.

(51) Int. Cl.
G09G 3/16 (2006.01)
(52) U.S. Cl.
USPC ............................................. 345/48; 345/107
(58) Field of Classification Search ........................ None
See application file for complete search history.

(56) References Cited

U.S. PATENT DOCUMENTS

| | | | |
|---|---|---|---|
| 4,083,626 A | 4/1978 | Miyahara et al. |
| 5,151,801 A | 9/1992 | Hiroshima |
| 6,144,430 A | 11/2000 | Kuo |
| 6,166,787 A | 12/2000 | Akins et al. |
| 6,277,263 B1 | 8/2001 | Chen |
| 6,327,013 B1 | 12/2001 | Tombling et al. |
| 6,556,261 B1 | 4/2003 | Krusius et al. |
| 6,565,729 B2 | 5/2003 | Chen et al. |
| 6,581,286 B2 | 6/2003 | Campbell et al. |
| 6,753,064 B1 | 6/2004 | Nakama et al. |
| 6,784,962 B2 | 8/2004 | Sumida et al. |
| 6,806,995 B2 | 10/2004 | Chung et al. |
| 6,930,818 B1 | 8/2005 | Liang et al. |
| 6,940,569 B2 | 9/2005 | Tanaka et al. |
| 6,997,595 B2 | 2/2006 | Mi et al. |
| 7,061,569 B2 | 6/2006 | Yun et al. |
| 7,088,404 B2 | 8/2006 | Otake et al. |
| 7,160,017 B2 | 1/2007 | Lee et al. |
| 7,184,188 B2 | 2/2007 | Kamijima |
| 7,244,476 B2 | 7/2007 | Sumida et al. |
| 7,248,394 B2 | 7/2007 | Ding et al. |
| 7,286,197 B2 | 10/2007 | Kwon et al. |
| 7,294,866 B2 | 11/2007 | Liu |

(Continued)

FOREIGN PATENT DOCUMENTS

| | | |
|---|---|---|
| JP | 2001-264819 | 9/2001 |
| WO | WO 01/67170 | 9/2001 |
| WO | WO 2008/122927 | 10/2008 |
| WO | WO 2009/114361 | 9/2009 |

OTHER PUBLICATIONS

U.S. Appl. No. 12/837,350, filed Jul. 15, 2010, Sprague et al.
U.S. Appl. No. 12/843,396, filed Jul. 26, 2010, Sprague et al.

(Continued)

*Primary Examiner* — Lixi C Simpson
(74) *Attorney, Agent, or Firm* — Perkins Coie LLP.

(57) ABSTRACT

The present invention is directed to luminance enhancement structure for reflective display devices. The structure not only can enhance the brightness of a display device, but also can reduce the Moiré effect of the display device. The present invention is also directed to a display device comprising an array of microcups and a luminance enhancement structure.

15 Claims, 11 Drawing Sheets

U.S. PATENT DOCUMENTS

| | | | |
|---|---|---|---|
| 7,332,066 | B2 | 2/2008 | Chen et al. |
| 7,339,716 | B2 | 3/2008 | Ding et al. |
| 7,342,556 | B2 | 3/2008 | Oue et al. |
| 7,397,619 | B2 | 7/2008 | Hwang et al. |
| 7,408,696 | B2 | 8/2008 | Liang et al. |
| 7,463,317 | B2 | 12/2008 | Takizawa et al. |
| 7,543,973 | B2 * | 6/2009 | Shimura ............. 362/619 |
| 7,564,519 | B2 | 7/2009 | Takizawa |
| 7,576,914 | B2 | 8/2009 | Goto |
| 7,612,846 | B2 | 11/2009 | Takizawa et al. |
| 7,638,808 | B2 | 12/2009 | Owen et al. |
| 7,667,785 | B2 | 2/2010 | Van Gorkom et al. |
| 7,693,389 | B2 | 4/2010 | Kamijima |
| 7,830,592 | B1 | 11/2010 | Sprague et al. |
| 8,237,892 | B1 | 8/2012 | Sprague et al. |
| 2001/0006409 | A1 | 7/2001 | Lee |
| 2001/0026347 | A1 | 10/2001 | Sawasaki et al. |
| 2001/0026445 | A1 | 10/2001 | Naghi et al. |
| 2002/0033927 | A1 | 3/2002 | Mun et al. |
| 2002/0057413 | A1 | 5/2002 | Sumida et al. |
| 2003/0165016 | A1 | 9/2003 | Whitehead et al. |
| 2003/0234900 | A1 | 12/2003 | Kim |
| 2005/0003108 | A1 | 1/2005 | Sumida et al. |
| 2005/0041311 | A1 | 2/2005 | Mi et al. |
| 2005/0140846 | A1 | 6/2005 | Lubart et al. |
| 2005/0141844 | A1 | 6/2005 | Olczak |
| 2006/0034099 | A1 * | 2/2006 | Yang et al. ............. 362/615 |
| 2006/0055627 | A1 * | 3/2006 | Wilson ............. 345/3.1 |
| 2006/0103779 | A1 * | 5/2006 | Amemiya et al. ............. 349/95 |
| 2006/0291247 | A1 * | 12/2006 | Kao et al. ............. 362/615 |
| 2007/0063965 | A1 | 3/2007 | Kawai |
| 2007/0152592 | A1 | 7/2007 | Kim et al. |
| 2007/0160811 | A1 | 7/2007 | Gaides et al. |
| 2007/0200975 | A1 | 8/2007 | Kamijima |
| 2007/0253072 | A1 | 11/2007 | Mullen et al. |
| 2008/0012034 | A1 | 1/2008 | Thielen et al. |
| 2009/0097273 | A1 * | 4/2009 | Chang ............. 362/618 |
| 2009/0231245 | A1 | 9/2009 | Lin |
| 2010/0177396 | A1 | 7/2010 | Lin |
| 2010/0182351 | A1 | 7/2010 | Lin |
| 2010/0225999 | A1 | 9/2010 | Lin et al. |
| 2010/0271407 | A1 | 10/2010 | Ho et al. |
| 2011/0043894 | A1 | 2/2011 | Sprague et al. |
| 2011/0057927 | A1 | 3/2011 | Lin |

OTHER PUBLICATIONS

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, P4-3. (Int'l Conference on Consumer Electronics, Jan. 9-13, 2008).

Zang, HM., Wang, F., Kang, Y.M., Chen, Y., and Lin, W. (Jul. 2007) *Microcup® e-Paper for Embedded and Flexible Designs*. IDMC'07, Taipei International Convention Center, Taiwan.

Zang, HM., (Feb. 2007) *Developments in Microcup® Flexible Displays*. Presentation conducted at the 6th Annual Flexible Display and Microelectronics Conference, Phoenix, AZ Feb. 6-8.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Zang, HM., (Sep. 2006) *Monochrome and Area Color Microcup® EPDs by Roll-to-Roll Manufacturing Process*. Presentation conducted at the Forth Organic Electronics Conference and Exhibition (OEC-06), Sep. 25-27, 2006, Frankfurt, Germany.

Wang, X., Zang, HM., and Li, P. (Jun. 2006) Roll-to-Roll Manufacturing Process for Full Color Electrophoretic film. *SID Digest*, 00pp. 1587-1589.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Liang, R.C., (Feb. 2005) *Flexible and Roll-able Displays/Electronic Paper—A Brief Technology Overview*. Flexible Display Forum, 2005, Taiwan.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Ho, Candice. (Feb. 1, 2005) *Microcupt® Electronic Paper Device and Applicaiton*. Presentation conducted at USDC 4th Annual Flexible Display Conference 2005.

Bardsley, J.N. & Pinnel, M.R. (Nov. 2004) Microcup™ Electrophoretic Displays. *USDC Flexible Display Report*, 3.1.2. pp. 3-12-3-16.

Liang, R.C. (Oct. 2004) *Flexible and Roll-able Displays/Electronic Paper—A Technology Overview*. Paper presented at the METS 2004 Conference in Taipie, Taiwan.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Zang, H.M. (Feb. 2004). *Microcup Electronic Paper*. Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Ho, C.,& Liang, R.C. (Dec. 2003). *Microcup® Electronic Paper by Roll-to-Roll Manufacturing Processes*. Presentation conducted at FEG, Nei-Li, Taiwan.

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Allen, K. (Oct. 2003). Electrophoretics Fulfilled. *Emerging Displays Review: Emerging Display Technologies*, Monthly Report—Oct. 2003, 9-14.

Zang, H.M., & Liang, R.C. (2003) Microcup Electronic Paper by Roll-to-Roll Manufacturing Processes. *The Spectrum*, 16(2), 16-21.

Chen, S.M. (Jul. 2003) The Applications for the Revolutionary Electronic Paper Technology. *OPTO News & Letters*, 102, 37-41. (in Chinese, English abstract attached).

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C., Hou, J., Chung, J., Wang, X., Pereira, C., & Chen, Y. (May 2003). Microcup® Active and Passive Matrix Electrophoretic Displays by A Roll-to-Roll Manufacturing Processes. *SID Digest*, vol. 34, Issue 1, pp. 838-841, 20.1.

Chen, S.M. (May 2003) The New Application and the Dynamics of Companies. *TRI*. 1-10. (In Chinese, English abstract attached).

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., & Tseng, S. (Feb. 2003). *Microcup® LCD, A New Type of Dispersed LCD by A Roll-to-Roll Manufacturing Process*. Paper presented at the IDMC, Taipei, Taiwan.

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., & Zang, H.M. (Dec. 2002) Microcup Electrophoretic Displays by Roll-to-Roll Manufacturing Processes. *IDW*, EP2-2, 1337-1340.

Nikkei Microdevices. (Dec. 2002) Newly-Developed Color Electronic Paper Promises—Unbeatable Production Efficiency. *Nikkei Microdevices*, p. 3. (in Japanese, with English translation).

U.S. Appl. No. 12/323,315, filed Nov. 25, 2008, Sprague et al.

\* cited by examiner

LUMINANCE ENHANCEMENT STRUCTURE WITH MOIRÉ REDUCING DESIGN

This application claims priority to U.S. Provisional Application No. 61/120,243, filed Dec. 5, 2008; the content of which is incorporated herein by reference in its entirety.

FIELD OF THE INVENTION

The present invention is directed to a luminance enhancement structure for reflective display devices. The structure not only can enhance the brightness of a display device; but also can reduce the Moiré pattern effect.

BACKGROUND OF THE INVENTION

The lack of satisfactory brightness is often a concern for electrophoretic display devices. Total internal reflection would occur with electrophoretic display devices due to the fact that the display device usually has components of a high refractive index. Because of the components having a higher refractive index (e.g., about 1.5) than the air (which has a refractive index of about 1) surrounding the display panel, some of the scattering light from the display panel may reflect back to the display device by total internal reflection. This total internal reflection phenomenon could result in a loss of about 30-50% of the scattering light, thus causing reduction in brightness.

A luminance enhancement structure can be used to enhance the brightness of an electrophoretic display. However, when a luminance enhancement structure is applied onto an electrophoretic display, the Moiré effect may occur which could significantly affect the quality of the images displayed. The Moiré effect may be avoided by designing different luminance enhancement structures for different display devices, depending on the size and shape of the display cells of the display device. In other words, depending on the size and shape of its display cells (or other equivalent repeated patterns, such as active matrix backplane), each display device has to have a customized luminance enhancement structure to avoid the Moiré effect. Such an approach obviously is not desirable because it could be costly.

SUMMARY OF THE INVENTION

The present invention is directed to a luminance enhancement structure which not only can enhance the brightness of a display device, but also can reduce the Moiré effect, regardless of the size and shape of the display cells in the display device. Moreover, the luminance enhancement structure of the present invention has the additional advantage that the brightness of the display device may change depending on the viewing angle, in a more uniform manner.

One aspect of the invention is directed to a luminance enhancement structure which comprises columns and grooves wherein said columns have wavy edges. In one embodiment, the grooves have a triangular cross-section. The surface of the grooves is optically flat and optionally coated with a metal layer. In one embodiment, the enhancement structure has a thickness in the range of about 10 µm to about 200 µm. In one embodiment, the enhancement structure is formed from a material having a refractive index of about 1.4 to 1.7. In one embodiment, the wavy edges shift in the X direction while the columns themselves extend in the Z direction. In one embodiment, the widths of the top surface of the columns are equal when cross-sectioned by parallel lines. In one embodiment, the grooves have the same apex angle. In one embodiment, the variance of the shift of the wavy edges is within 15% of the nominal or average period of the variance in the Z direction. In one embodiment, no column has a shift pattern of the wavy edges matching the shift pattern of another column within 10 or more columns.

Another aspect of the invention is directed to a display device which comprises an array of microcups and a luminance enhancement structure on the viewing side of the display device wherein said luminance enhancement structure comprises columns and grooves and said columns have wavy edges. In one embodiment, the grooves have a triangular cross-section. In one embodiment, the surface of the grooves is optically flat and optionally coated with a metal layer. In one embodiment, the luminance enhancement structure has a thickness in the range of about 10 µm to about 200 µm. In one embodiment, the luminance enhancement structure is formed from a material having a refractive index of about 1.4 to 1.7. In one embodiment, the wavy edges shift in the X direction while the columns themselves extend in the Z direction. In one embodiment, the widths of the top surface of the columns are equal when cross-sectioned by parallel lines. In one embodiment, the grooves have the same apex angle. In one embodiment, the variance of the shift of the wavy edges is within 15% of the nominal or average period of the variance in the Z direction. In one embodiment, no column has a shift pattern of the wavy edges matching the shift pattern of another column within 10 or more columns. In one embodiment, the microcups are filled with an electrophoretic fluid. In one embodiment, the display device further comprises two electrode layers. One of the electrode layers comprises thin film transistor pixel electrodes or is a patterned segment electrode layer.

DETAILED DESCRIPTION OF THE INVENTION

I. Definitions

The technical term "total internal reflection" used in this application refers to an optical phenomenon that occurs when a ray of light strikes a medium boundary at an angle greater than the critical angle with respect to the normal axis to the surface. This can only occur where light travels from a medium with a higher refractive index to one with a lower refractive index.

Generally speaking, when a ray of light crosses a boundary between materials with different refractive indices, the light will be partially refracted at the boundary surface, and partially reflected. However, if the angle of incidence is greater than the critical angle, the light will stop crossing the boundary and instead be totally reflected back.

The critical angle is calculated based on the equation of Snell's law: $C=\sin^{-1}(n2/n1)$ wherein n1 and n2 are the refractive indices of the two different media, with n1 being the higher refractive index and n2 being the lower refractive index.

The terms "period" and "frequency" have the commonly known meanings. The time it takes to complete a cycle (360°, as indicated by arrows in FIG. 1) is a "period" and "frequency" is the inverse of the "period". In other words, frequency is the number of cycles in a certain time frame.

The term "Moiré pattern" is a pattern created by stacking one layer having a repetitive pattern on top of another layer also having a repetitive pattern. The two repeated patterns may be different. For example, a Moiré pattern may become visible when a microcup layer is placed on top of a TFT (thin film transistor) layer.

II. Display Devices

Figure 2:
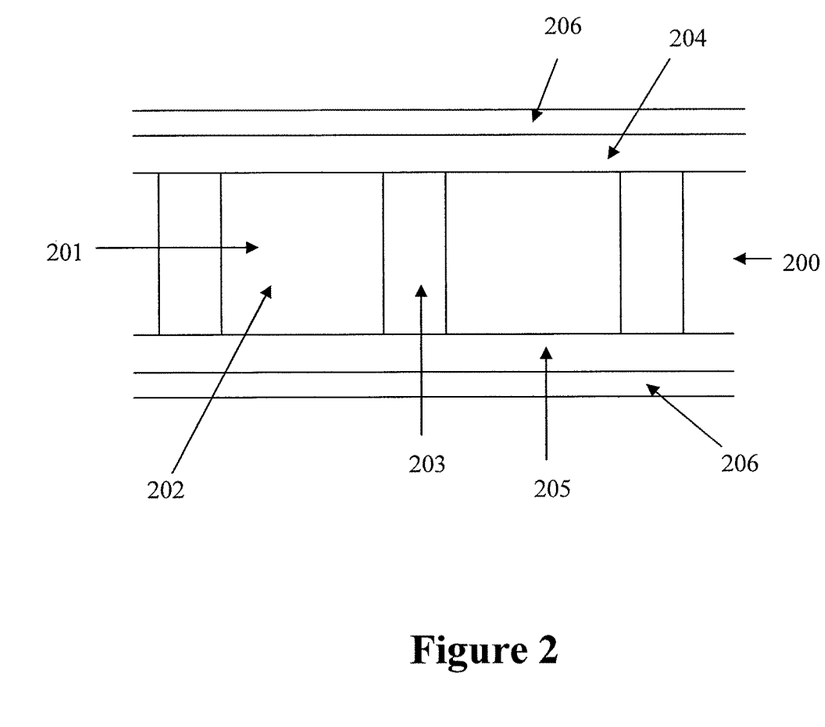
FIG. 2 illustrates a display device.

FIG. 2 illustrates a display device (200). The device comprises an array of display cells (201) filled with a display fluid (202). Each of the display cells is surrounded by partition walls (203). The array of display cells is sandwiched between two electrode layers (204 and 205).

For an electrophoretic display panel, the display cells are filled with an electrophoretic fluid which comprises charged pigment particles dispersed in a solvent. The display fluid may be a system comprising one or two types of particles.

In the system comprising only one type of particles, the charged pigment particles are dispersed in a solvent of a contrasting color. The charged particles will be drawn to one of the electrode layers (204 or 205), depending on the potential difference of the two electrode layers, thus causing the display panel to show either the color of the particles or the color of the solvent, on the viewing side.

In a system comprising particles carrying opposite charges and of two contrasting colors, the particles would move to one electrode layer or the other, based on the charge that they carry and the potential difference of the two electrode layers, causing the display panel to show the two contrasting colors, on the viewing side. In this case, the particles may be dispersed in a clear solvent.

The display cells may also be filled with a liquid crystal composition. In addition, it is understood that the present invention is applicable to all types of reflective display devices.

For a segment display device, the two electrode layers (204 and 205) are one common electrode (e.g., ITO) and one patterned segment electrode layer, respectively. For an active matrix display device, the two electrode layers (204 and 205) are one common electrode and an array of thin film transistor pixel electrodes, respectively. For a passive matrix display device, the two electrode layers (204 and 205) are two line-patterned electrode layers.

The electrode layers are usually formed on a substrate layer (206) [(such as polyethylene terephthalate (PET)). The thickness of the substrate layer (206) is usually between about 5 µm to about 175 µm, more preferably between about 5 µm to about 50 µm. The substrate layer may also be a glass layer.

For a microcup-based display device disclosed in U.S. Pat. No. 6,930,818, the content of which is incorporated herein by reference in its entirety, the filled display cells are sealed with a polymeric sealing layer. Such a display device may be viewed from the sealing layer side or the side opposite the sealing layer side, depending on the transparency of the materials used and the application.

III. The Luminance Enhancement Structure

Figure 3A:
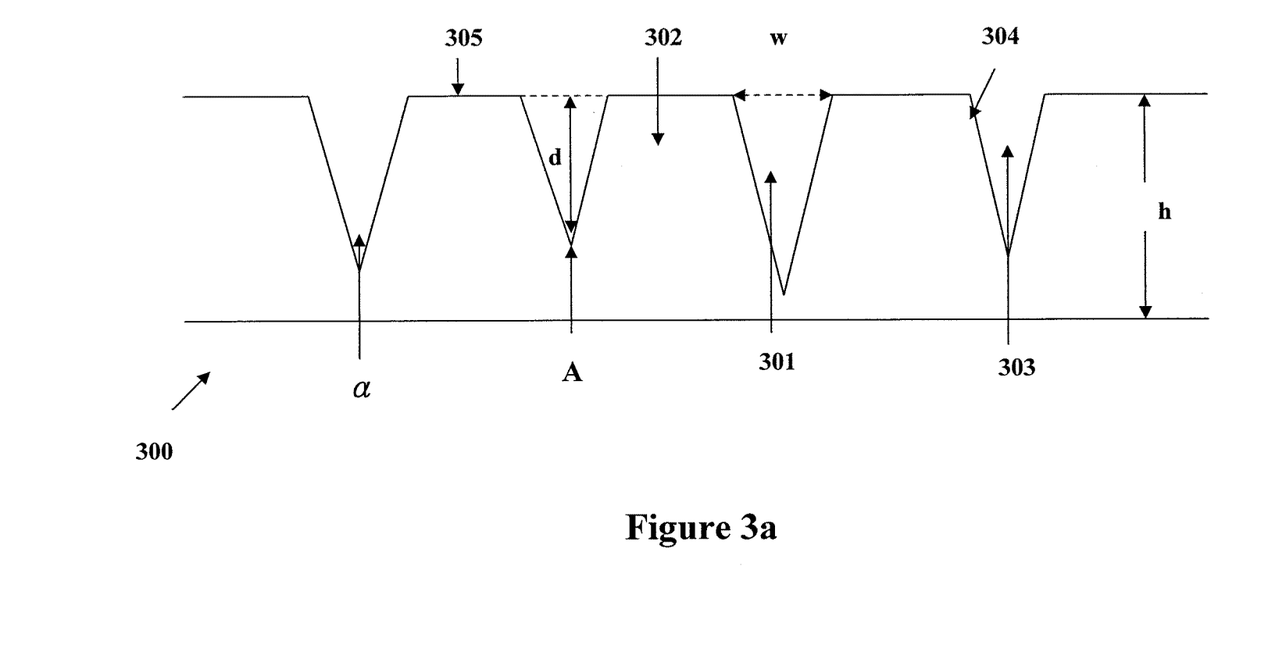
FIG. 3a depicts a luminance enhancement structure of the present invention.
Figure 3B:
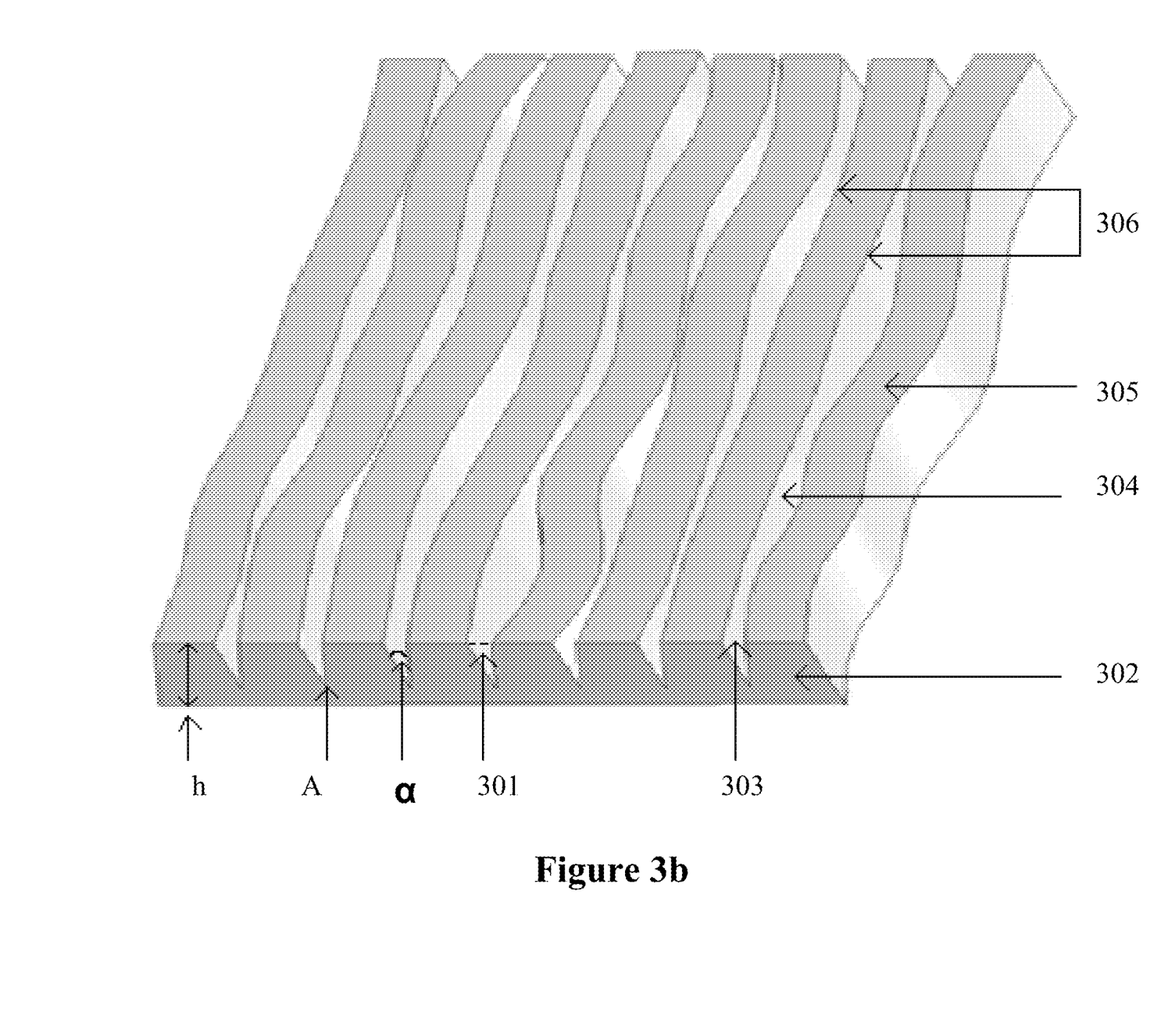
FIGS. 3b and 3c show the three-dimensional view of the luminance enhancement structure.
Figure 3C:
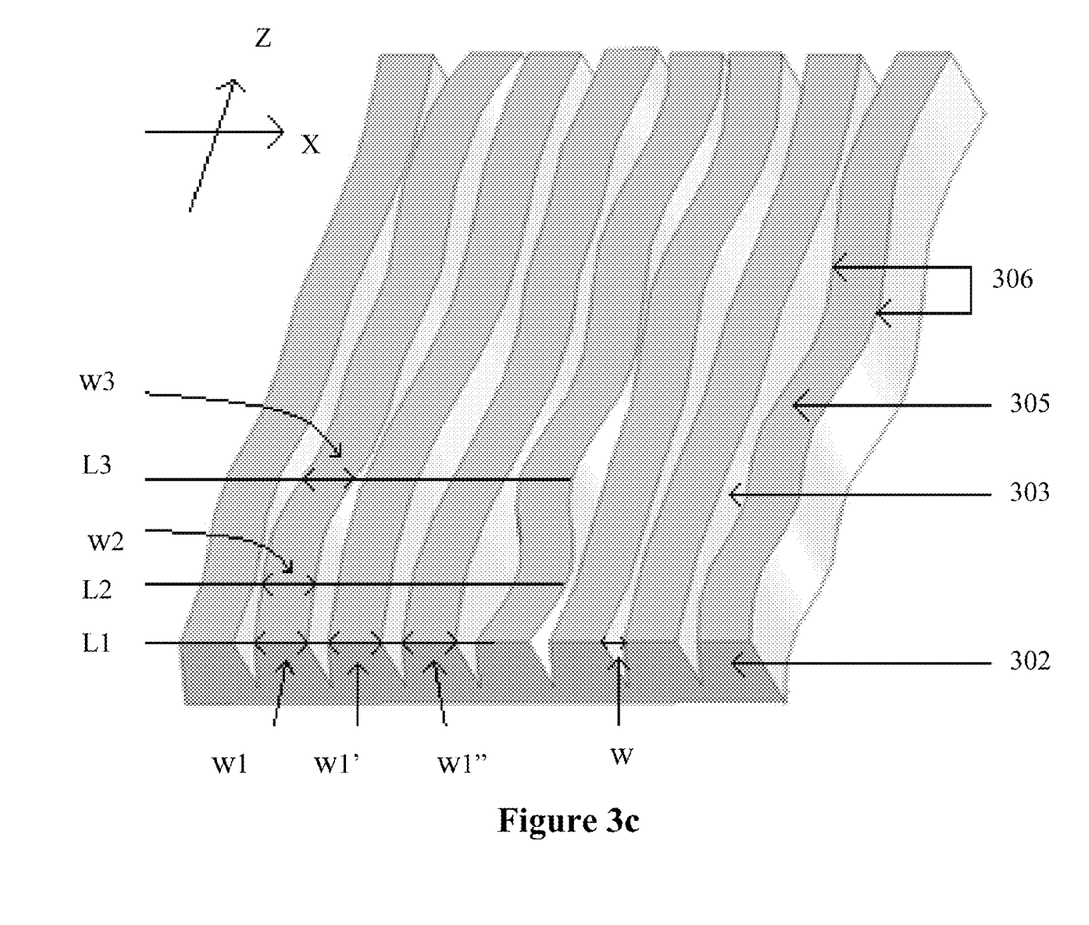

FIG. 3a is a cross-section view of a luminance enhancement structure (300) of the present invention. FIGS. 3b and 3c are three-dimensional view of the luminance enhancement structure (300). There are multiple columns (302) and grooves (303) across the structure. The grooves (303) and the columns (302) are in alternating order.

The groove has a triangular cross-section (301), an apex angle α and a top point A. The surface (304) of the grooves is optically flat and may optionally be coated with a metal layer. In the context of this application, the terms "groove" or "grooves" refers to the groove or grooves the surface of which is either uncoated or coated. In one embodiment of the present invention, the surface of the groove or grooves is preferably uncoated. The columns (302) have a top surface (305).

The thickness of the luminance enhancement structure may be in the range of about 10 µm to about 200 µm. The thickness of the luminance enhancement structure is expressed as the height ("h") of the column (302) in FIGS. 3a and 3b.

The luminance enhancement structure is formed from a material having a refractive index of about 1.4 to 1.7. The luminance enhancement structure is transparent.

The columns have wavy edges (306). Each column has two wavy edges, as shown in FIGS. 3b and 3c. The edges shift in the X direction (i.e., horizontally) while the columns themselves extend in the Z direction. By having the edges shifting only in the X direction (i.e., horizontally), the surface (305) of the columns is on the same plane. This facilitates the lamination of the luminance enhancement structure to a display device. The X and Z directions are indicated in FIG. 3c. The Y direction (not indicated) is perpendicular to the plane of luminescent enhancement structure: i.e., is perpendicular to the plane of surface 305.

In a single column, the widths (e.g., w1, w2, w3, etc.) of the top surface (305) of the column are equal when cross-sectioned by parallel lines (e.g., L1, L2, L3, etc.). In addition, the widths (e.g., w1, w1', w1", etc) of the top surface (305) of all columns (302) are also equal when cross-sectioned by a same line.

The horizontal shift of the edges, however, will cause the base width (w) of the grooves (303) to vary. As a result, the depth (d) of the grooves will also vary. The apex angles of all the grooves are equal in the same luminance enhancement structure.

Figure 1:
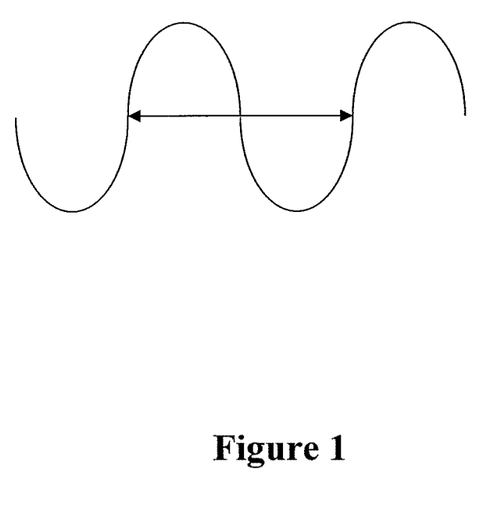
FIG. 1 illustrates the terms "period" and "frequency".

The variance of the horizontal shift of the edges is generally small, preferably within 15% of the nominal or average period of the variance in the Z direction. The term "period" is the time needed to complete a cycle (as shown in FIG. 1).

The variance of the shift pattern may change from one column to another column. The frequency of changes in the Z direction for each individual column is usually high so that the changing patterns will not be detectable by human eyes.

It is preferred that every column has a different horizontal shift pattern so that no column will have a shift pattern matching the shift pattern of another column within a certain range (e.g., within 10 or more columns). This design will help reduce the Moiré pattern when the luminance enhancement structure is laminated over a display device.

IV. Dimensions of the Luminance Enhancement Structure

Figure 4A:
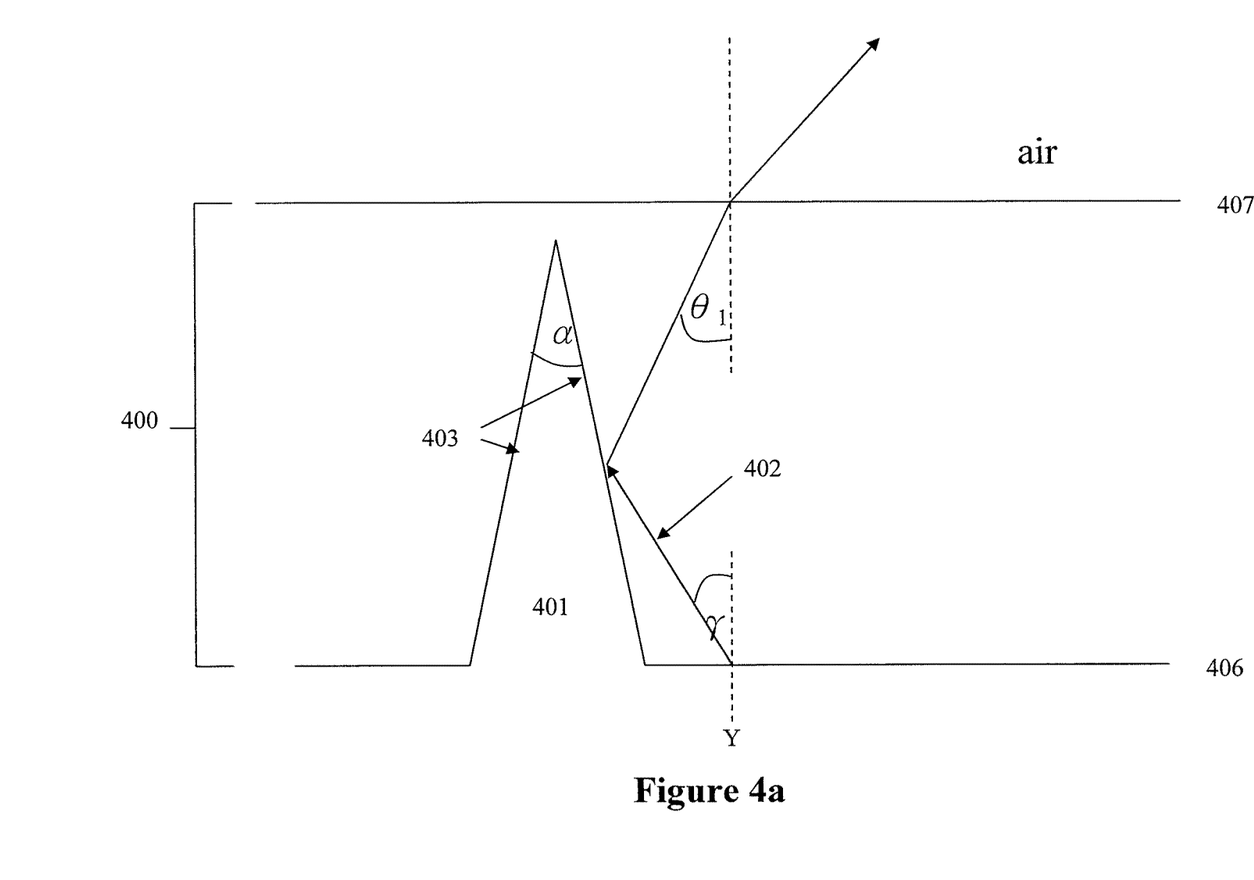
FIGS. 4a and 4b illustrate the dimensions of the luminance enhancement structure.
Figure 4B:
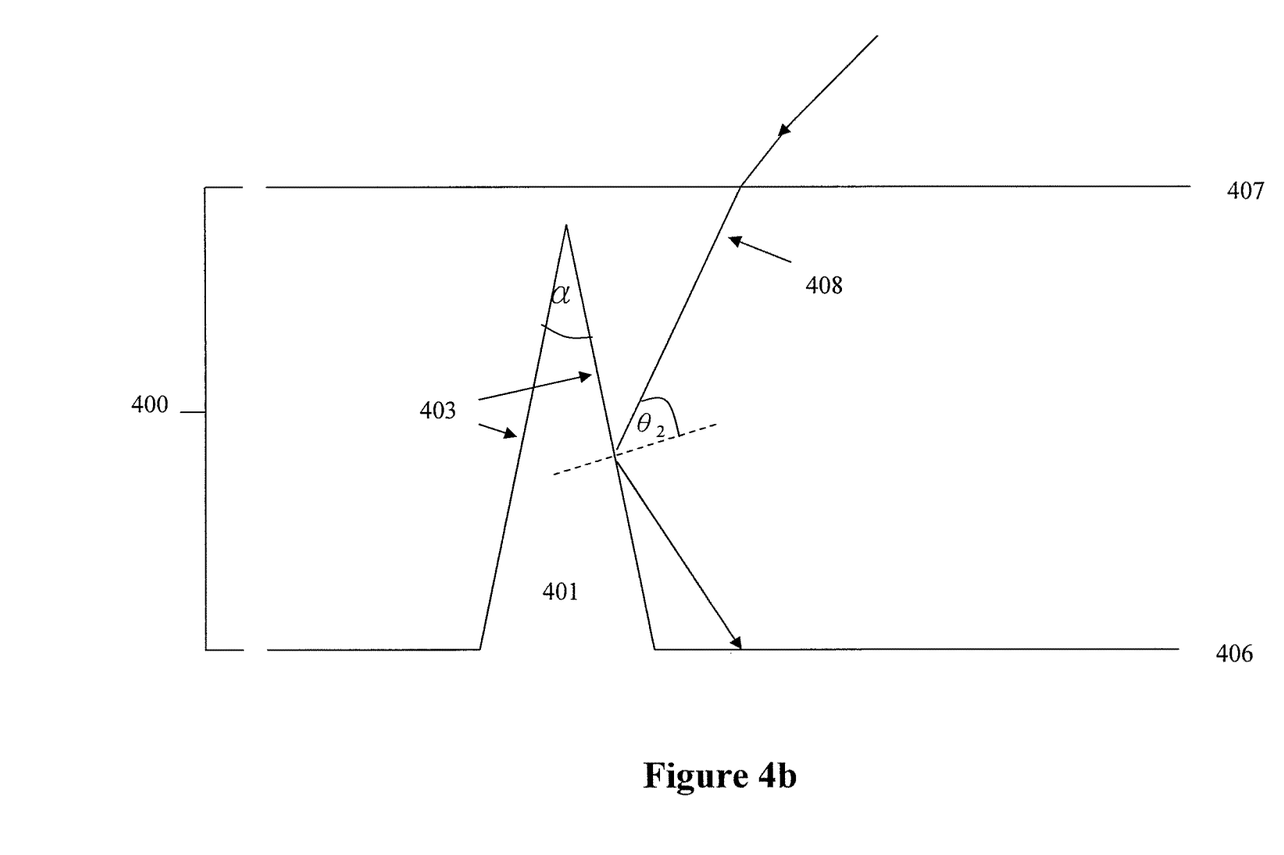

FIGS. 4a and 4b illustrate the dimensions of a groove of a luminance enhancement structure of the present invention.

In FIG. 4a, it is shown that the design aims to ensure an angle of incidence $\theta_1$ to be smaller than the critical angle $C_1$ (not shown) at the boundary between the top surface (407) of the luminance enhancement structure (400) and air.

The critical angle $C_1$, in this case, is about 42° based on the refractive index of the material for the luminance enhancement structure being 1.5 and the refractive index of air surrounding the top surface of the luminance enhancement structure being 1.

As shown in FIG. 4a, the light (402) scattered from the surface (406) (i.e., 305 in FIGS. 3a-3c) is reflected at the tilted surface (403) of the groove (401) and reaches the top surface (407) of the luminance enhancement structure (400). In order for the angle of incidence ($\theta_1$) at the top surface of the luminance enhancement structure to be smaller than 42°, the apex angle $\alpha$ of the groove (401) is preferably in the range of 5 to 50°, more preferably in the range of 15 to 30°. As a result, the angle of incidence $\theta_1$ will be smaller than the angle $\gamma$, which reduces the chance of total internal reflection at the top surface and increases the overall optical efficiency. The angle $\gamma$ is an angle at the intersection of the light (402) and the normal axis (marked Y) of the surface (406).

An incoming light (not shown) from a light source transmits through the luminance enhancement structure and strikes the display device and is then reflected with a scattering profile. The scattered light 402 in FIG. 4a is an example of such a reflected light.

FIG. 4b demonstrates that the tilted surface (403) of the groove (401) will reflect incoming light by total internal reflection. The design aims to ensure that the light striking the tilted surface (403) of the groove (401) will be reflected instead of transmitting through the space within the groove. The critical angle (not shown) at the boundary between the tilted surface (403) and the space within the groove may be calculated based on the refractive index of the material for the luminance enhancement structure and the refractive index of what is filled in the space of the groove (401). If the groove is unfilled, the refractive index of air is about 1. With the refractive index of the material for the luminance enhancement structure being about 1.5, the critical angle $C_2$ would be about 42°. When the angle of incidence $\theta_2$ of the light (408) coming from the surface (407) is greater than 42°, the light striking the tilted surface (403) will be totally internal reflected towards the surface 406 which is desired in this case because, otherwise, the light would transmit through the space in the groove.

A reflective tilted surface may be achieved by coating a metal layer over the surface of the groove. However, in one embodiment of the present invention, the surface of the grooves is uncoated.

V. Display Device with the Luminance Enhancement Structure

Figure 5:
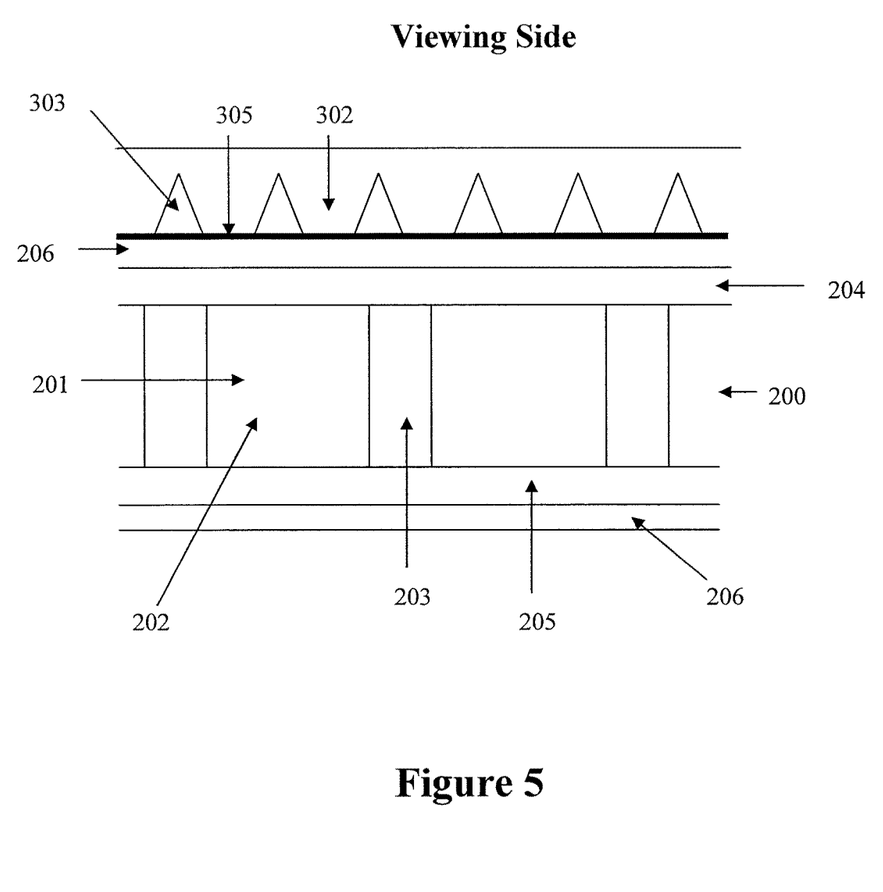
FIG. 5 depicts a display device with the luminance enhancement structure on its viewing side.

FIG. 5 depicts a cross-section view of the luminance enhancement structure on the viewing side of the display device. As shown, the luminance enhancement structure of FIG. 3a has been turned 180°, with the top surface (305) of the columns (302) now in optical contact with the substrate layer (206) of the display device, which means that there is no air gap between the top surface 305 and the substrate layer 206. This may be achieved by an optical adhesive material, such as the Norland® optical adhesive.

The thickness of the substrate layer (206) between the luminance enhancement structure and the display device is preferably in the range of about 0 to about 25 µm, preferably in the range of about 0 to about 20 µm.

The space within the grooves (303) usually is filled with air. It is also possible for the space to be in a vacuum state. Alternatively, the space in the grooves (303) may be filled with a low refractive index material, lower than the refractive index of the material forming the luminance enhancement structure.

VI. Fabrication of the Luminance Enhancement Structure

The luminance enhancement structure may be fabricated in many different ways.

A Fast Tool Servo system with precision single point diamond turning is one of the methods which may be used to manufacture the luminance enhancement structure. The hard tools may be very small diamond tools mounted on CNC (computer numeric control) machines (e.g., turning, milling and ruling/shaping machines). These machines may have vibration devices attached to assist the tools to create the horizontal shifts with different levels of irregularity. Examples include STS (Slow Tool Servo), FTS (Fast Tool Servo) and other ultrasonic vibration apparatus. U.S. Pat. No. 6,581,286 discloses one of the applications of the FTS for creating grooves on an optical film by using thread cutting. The tool is mounted onto the machine to create constant peak apex angle of cavities in relation to X-Y planes along the Z direction within a basic element. By using a tool to form surfaces in a mold in relation to increasing degrees of freedom, three-dimensionally varying irregular prism blocks of the structured surfaces of the optical substrates can be obtained.

The non-regularity design of the present invention causes every column to redirect the light by a different factor, resulting in a different viewing angle distribution for every column, which are then combined to form a more uniform changing viewing angle for the luminance enhancement structure.

The refraction index of the material for forming the luminance enhancement structure is preferably greater than about 1.4, more preferably between about 1.5 and about 1.7.

The luminance enhancement structure may be used as is or further coated with a metal layer. In the latter case, a metal layer is then deposited over the surface of the grooves. Suitable metals for this step may include, but are not limited to, aluminum, copper, zinc, tin, molybdenum, nickel, chromium, silver, gold, iron, indium, thallium, titanium, tantalum, tungsten, rhodium, palladium, platinum and cobalt. Aluminum is usually preferred. The metal material must be reflective, and it may be deposited on the surface of the grooves, using a variety of techniques such as sputtering, evaporation, roll transfer coating, electroless plating or the like.

Figure 6A:
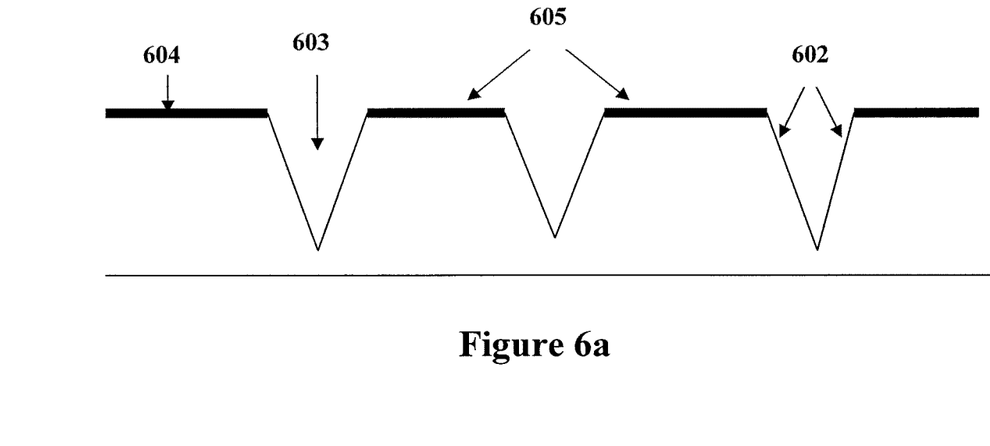
FIGS. 6a-6e illustrate the formation of a luminance enhancement structure coated with a metal layer.

In order to facilitate formation of the metal layer only on the intended surface of the grooves, a strippable masking layer may be coated before metal deposition, over the surface on which the metal layer is not to be deposited. As shown in FIG. 6a, a strippable masking layer (604) is coated onto the surface (605) between the openings of the grooves. The strippable masking layer is not coated on the surface (602) of the grooves (603).

The coating of the strippable masking layer may be accomplished by a printing technique, such as flexographic printing, driographic printing, electrophotographic printing, lithographic printing, gravure printing, thermal printing, inkjet printing or screen printing. The coating may also be accomplished by a transfer-coating technique involving the use of a release layer. The strippable masking layer preferably has a thickness in the range of about 0.01 to about 20 microns, more preferably about 1 to about 10 microns.

For ease of stripping, the layer is preferably formed from a water-soluble or water-dispersible material. Organic materials may also be used. For example, the strippable masking layer may be formed from a re-dispersible particulate material. The advantage of the re-dispersible particulate material is that the coated layer may be easily removed without using a solubility enhancer. The term "re-dispersible particulate" is derived from the observation that the presence of particles in the material in a significant quantity will not decrease the stripping ability of a dried coating and, on the contrary, their presence actually enhances the stripping speed of the coated layer.

The re-dispersible particulate consists of particles that are surface treated to be hydrophilic through anionic, cationic or non-ionic functionalities. Their sizes are in microns, preferably in the range of about 0.1 to about 15 um and more preferably in the range of about 0.3 to about 8 um. Particles in these size ranges have been found to create proper surface roughness on a coated layer having a thickness of <15 um. The re-dispersible particulate may have a surface area in the range of about 50 to about 500 $m^2/g$, preferably in the range of about 200 to about 400 $m^2/g$. The interior of the re-dispersible particulate may also be modified to have a pore volume in the range of about 0.3 to about 3.0 ml/g, preferably in the range of about 0.7 to about 2.0 ml/g.

Commercially available re-dispersible particulates may include, but are not limited to, micronized silica particles, such as those of the Sylojet series or Syloid series from Grace Davison, Columbia, Md., USA.

Non-porous nano sized water re-dispersible colloid silica particles, such as LUDOX AM can also be used together with the micron sized particles to enhance both the surface hardness and stripping rate of the coated layer.

Other organic and inorganic particles, with sufficient hydrophilicity through surface treatment, may also be suitable. The surface modification can be achieved by inorganic and organic surface modification. The surface treatment provides the dispensability of the particles in water and the re-wettability in the coated layer.

Figure 6B:
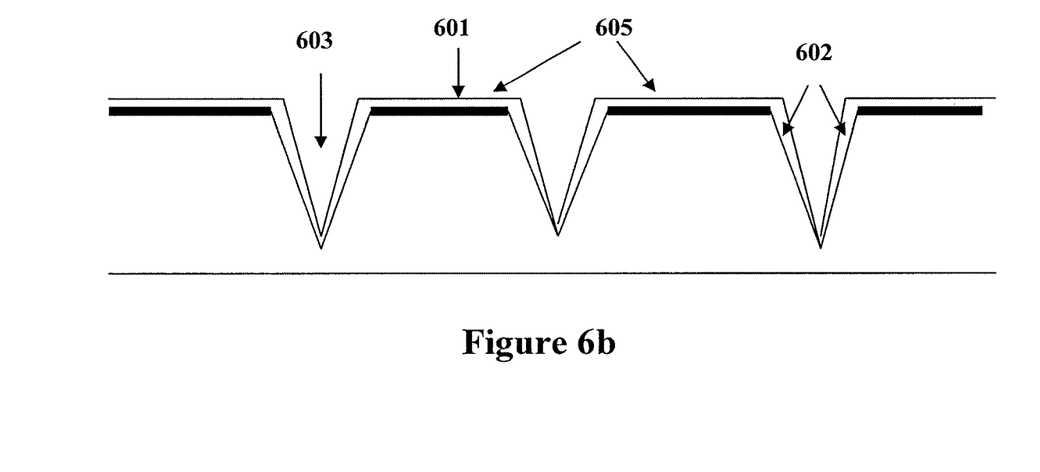

In FIG. 6b, a metal layer (601) is shown to be deposited over the entire surface, including the surface (602) of the grooves and the surface (605) between the grooves. Suitable metal materials are those as described above. The metal material must be reflective and may be deposited by a variety of techniques previously described.

Figure 6C:
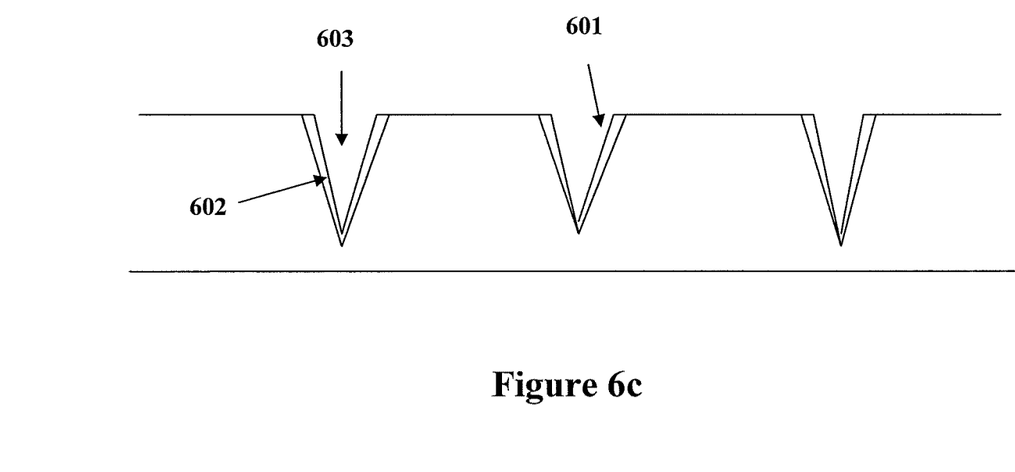

FIG. 6c shows the structure after removal of the strippable masking layer (604) with the metal layer 601 coated thereon. This step may be carried out with an aqueous or non-aqueous solvent such as water, MEK, acetone, ethanol or isopropanol or the like, depending on the material used for the strippable masking layer. The strippable masking layer may also be removed by mechanical means, such as brushing, using a spray nozzle or peeling it off with an adhesive layer. While removing the strippable masking layer (604), the metal layer (601) deposited on the strippable masking layer is also removed, leaving the metal layer (601) only on the surface (602) of the grooves.

Figure 6D:
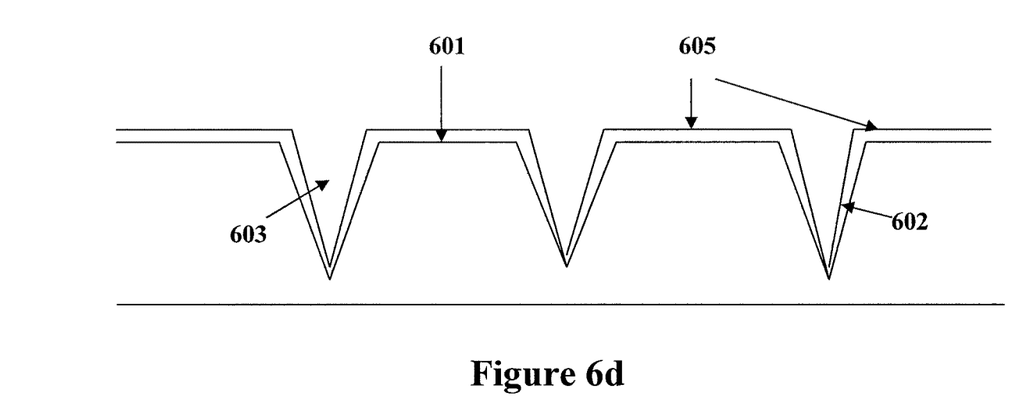
Figure 6E:
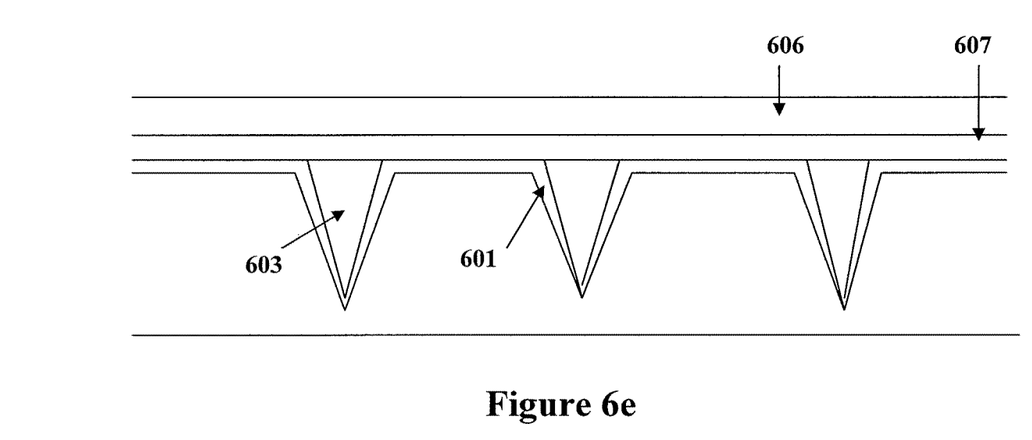

FIGS. 6d and 6e depict an alternative process for depositing the metal layer. In FIG. 6d, a metal layer (601) is deposited over the entire surface first, including both the surface (602) of the grooves and the surface (605) between the grooves. FIG. 6e shows that the film of grooves deposited with a metal layer (601) is laminated with a film (606) coated with an adhesive layer (607). The metal layer (601) on top of the surface (605) may be conveniently peeled off when the film of grooves is delaminated (separated) from the adhesive layer (607) coated film (606). The thickness of the adhesive layer (607) on the adhesive coated film is preferably in the range of about 1 to about 50 um and more preferably in the range of about 2 to about 10 um.

The luminance enhancement structure comprising grooves (uncoated or coated with a metal layer) is then laminated over a layer of display cells as described above.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device assembly comprising
   (a) a display device which comprises an array of display cells and a substrate layer which is above the display cells and on a viewing side of the display device; and
   (b) a luminance enhancement structure on top of the substrate layer, wherein one side of said luminance enhancement structure is flat and the opposite side comprises grooves and columns in an alternating order and each of the columns has a top surface which is in contact with the substrate layer of the display device and the columns have wavy edges.

2. The display device assembly of claim 1, wherein said grooves have a triangular cross-section.

3. The display device assembly of claim 2, wherein the surface of the grooves is optically flat.

4. The display device assembly of claim 1, wherein said luminance enhancement structure has a thickness in the range of about 10 μm to about 200 μm.

5. The display device assembly of claim 1, wherein said luminance enhancement structure is formed from a material having a refractive index of about 1.4 to 1.7.

6. The display device assembly of claim 1, wherein said wavy edges shift in the X direction while the columns themselves extend in the Z direction.

7. The display device assembly of claim 1, wherein the widths of the top surface of the columns are equal when cross-sectioned by parallel lines.

8. The display device assembly of claim 1, wherein the grooves have the same apex angle.

9. The display device assembly of claim 1, wherein the variance of the shift of the wavy edges is within 15% of the nominal or average period of the variance in the Z direction.

10. The display device assembly of claim 1, wherein no column has a shift pattern of the wavy edges matching the shift pattern of another column within 10 or more columns.

11. The display device assembly of claim 1, wherein said display cells are filled with an electrophoretic fluid.

12. The display device assembly of claim 1, further comprising two electrode layers.

13. The display device assembly of claim 12, wherein one of the electrode layers comprises thin film transistor pixel electrodes.

14. The display device assembly of claim 12, wherein one of the electrode layers is a patterned segment electrode layer.

15. The display device assembly of claim 2, wherein the surface of the grooves is coated with a metal layer.

* * * * *